United States Patent

[11] 3,549,880

[72] Inventor Perry A. Seay
Huntington, N.Y.
[21] Appl. No. 770,586
[22] Filed Oct. 25, 1968
Division of Ser. No. 476,278, Dec. 20, 1954, abandoned.
[45] Patented Dec. 22, 1970
[73] Assignee Dynamics Corporation of America
a corporation on New York

[54] APPARATUS FOR CONTROLLING THE SPEED OF A MOVING BODY
5 Claims, 12 Drawing Figs.
[52] U.S. Cl. .................................................. 246/182, 104/26
[51] Int. Cl. ..................................................... B61k 7/08
[50] Field of Search ......................................... 246/182.1, 182(A); 303/20, 19, 21; 104/26, 26.1; 340/262, 263; 235/193

[56] References Cited
UNITED STATES PATENTS
2,629,865 2/1953 Barker ........................ 246/30UX
3,283,146 11/1966 Berti ............................ 246/182
FOREIGN PATENTS
921,845 1/1947 France ....................... 246/182(A)
OTHER REFERENCES
A thesis prepared by Wilheim Koeth titled "Die Laufzielsteuerung In Der Albaufdynamik," Germany, 151 pages, Oct. 29, 1953. A copy is located in the Scientific Library, TF-592-KI.

Primary Examiner—Drayton E. Hoffman
Attorney—B. F. Spencer

ABSTRACT: A retarder control system for a railway classification yard which includes a radar velocity measuring system for measuring the instantaneous velocity of a moving car prior to the entry of the car into the car retarder together with a circuit responsive to the instantaneous velocity of the car for determining the acceleration of the car prior to entry into the car retarder, a computer responsive to the determined acceleration and other parameters for computing an exit velocity for the car from the retarder, and control circuits responsive to measured, computed and stored information for controlling the velocity of the car through the retarder to achieve the computed exit velocity.

INVENTOR.
PERRY A. SEAY

*INVENTOR.*
PERRY A. SEAY

INVENTOR.
PERRY A. SEAY

APPARATUS FOR CONTROLLING THE SPEED OF A MOVING BODY

This invention relates to apparatus for controlling the speed of a moving body and more specifically to a system for modifying the speed of a moving body during at least a portion of its travel so that it will arrive at its destination at a predetermined velocity.

While this invention is of general usefulness, it is particularly applicable to the control of freight cars in a classification yard. In the process of moving a railroad car across the country, it passes through a number of classification yards in which it is switched from one train to another in order that it may arrive at its destination by way of the best possible route. These yards usually consist of a single track on which the train may enter and a number of parallel tracks onto which the various cars in the entering train may be switched to make up trains going to different parts of the country. In these operations the tracks are usually inclined so that as the cars are released from the train one or more at a time they will roll under the force of gravity through the yard to their destination.

In order for the cars to couple properly, it has been established that they should reach their destination at a speed of approximately 2 miles per hour. It is customary to control this coupling speed by braking the car in a retarder located at a point slightly beyond the point of release from the main train. Experienced operators are used to estimate the speed at which the car should leave the retarder in order to properly couple with the next car ahead of it on the same track. The operator then brakes the car sufficiently to obtain the desired exit speed. Since the distance that the car may have to roll after it leaves the retarder may be as much as half a mile, it is easy to understand the difficulty in obtaining the proper retarder exit speed. To complicate the situation, cars have been found to have different coefficients of friction and will, therefore, have appreciably different rolling characteristics. In addition, the speed of the operation is such that as many as six or eight cars are usually in transit to their destination points during the time in which the operator of the retarder is required to apply braking to the next car. He therefore does not have an opportunity to observe the impact of a car coupling with the one ahead of it until he has permitted several additional cars to pass through the retarder, since the delay incurred between the time in which a car passes through the retarder and the time it actually couples may be as much as 2 or 3 minutes.

While the problem of braking each car or group of cars is somewhat simplified by the use of a standard slope approximating that required to compensate for the friction of an average car, the frictional coefficients of cars which actually vary from about 0.05 percent to 0.4 percent or more produce such wide variations in speed from car to car that it is necessary to provide for substantial retardation of the faster cars. In addition, the operator must also allow for the effects of wind which may produce velocity variations even greater than that produced by friction. Thus a retarder operator must estimate not only the effect of wind and friction on a particular car but also the distance each car must travel to arrive at its destination at a coupling speed of about 2 miles per hour.

While the minimum coupling speed that will insure positive coupling of each car with the next is the obvious objective, the retarder operator, in order to avoid loss of time caused by excessive retardation of the cars will tend to release the cars at a higher speed. This results in considerably increased stresses on each car and substantial damage, in many cases, not only to the cars but also to the goods carried in such cars.

This invention therefore has as one of its objects the provision of speed controlling means adapted to react on a moving body during a portion of its travel in accordance with the physical forces tending to modify the speed of the body so that the latter will arrive at a predetermined point in its travel at a desired speed. In the case of a freight car moving down a sloping track, this end may be attained through the provision of means for measuring gravitational, windage and frictional forces affecting the speed of the car and combining these effects with the distance the car must travel to its destination to determine the amount of braking required to cause the car to reach the destination at the desired speed. In addition, means may also be included for effecting substantially uniform retardation of a freight car or cars during the braking period so that they will be subjected to minimum strain and stress with the result that car maintenance problems and damage to goods carried thereby are materially reduced.

Another object of the invention is to provide a new and improved automatic retarder system for railroad cars characterized by its relative simplicity, low cost and dependability and wherein means are provided for enabling an operator to quickly test the equipment and to inform him of the failure of one or more components that would result in improper retardation of the cars.

A further object of the invention is to provide an automatic retarder for railroad cars that may be coordinated with the track switching means in the retarder yard and thereby enable more accurate compensation of the car speed to attain the desired coupling speed.

Still another object of the invention resides in a new and improved method and apparatus for actuating speed controlling means for a moving body so that the speed changes effected will not exceed the computed changes required to effect the desired ends.

Still another object of the invention resides in the provision of an improved method and apparatus for controlling the speed of freight cars in a classification yard.

The above and other objects and advantages of the invention will become more apparent from the following description and accompanying drawings forming part of this application.

Briefly, the invention concerns a method and apparatus for controlling the speed of a moving body such as a freight car or the like by determining the car and track characteristics that affect the speed of the car and utilizing these determinations for modifying the speed of the car in a desired manner. While it will become apparent that the invention is equally applicable to increasing as well as decreasing the speed of the car and to cases wherein both level and sloping tracks are employed, for present purposes the invention will be described in connection with a railroad classification yard employing a sloping track having speed retarding means disposed thereon.

In the movement of a car or other vehicle down a slope, the forces acting on the vehicle include gravity due to the slope, friction and windage. These forces, in the illustrated embodiment of the invention are assumed to be independent of velocity. The acceleration of the car is determined by measuring the time required for the car to transverse the distances between three equally spaced points along the path of travel.

Since the track slope is a constant for any given installation, the acceleration due to gravity resulting therefrom may be subtracted from the total measured acceleration to provide the net acceleration resulting from friction and windage acting on the car, this latter net acceleration being assumed to remain constant during the travel of the car to its destination. While the forces associated with friction and windage have been assumed to be independent of car speed it will become apparent that the computer can be arranged to automatically compensate for variations of these forces with car speed. In addition, the actual effect of the track slope is modified by track curvature, ice and other factors. Therefore references hereafter made to the effects of track slope refer to the effective slope rather than the actual slope.

Upon determination of the net acceleration, the vehicle moves through a retarder that will act on the car to decrease its speed to a predetermined value governed by the net acceleration and the slope and distance to the destination upon leaving the retarder. In order to attain the desired degree of braking to insure a final coupling speed of about 2 miles per hour, radar speed measuring means continuously measures the speed of the car within the retarder which is compared with a computed speed. The deviation between these two valves is utilized to actuate the retarder itself to effect the desired exit speed. In this way substantially constant braking can be attained during the time the car is within the retarder. If desired, however, any type of nonlinear deceleration or braking may be obtained.

Figures 1, 1A:
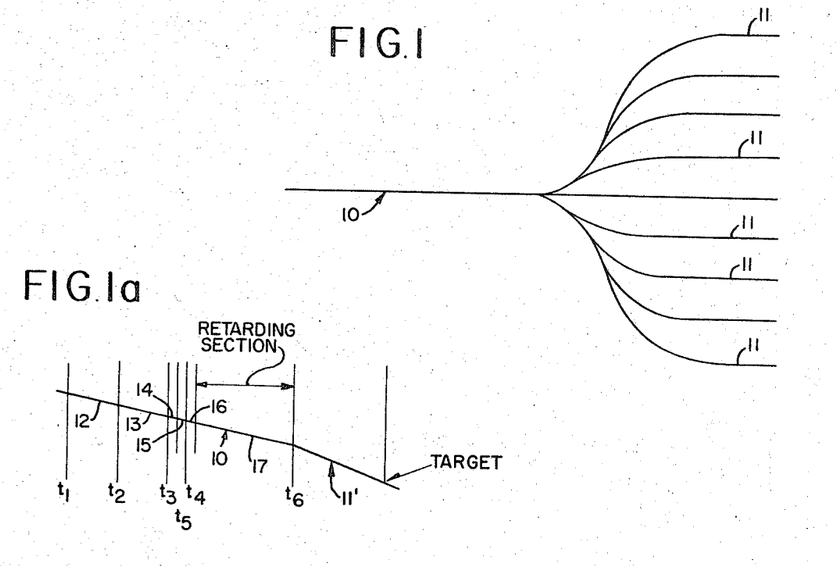
FIG. 1 is a plan view of a classification yard for freight cars in which trains are assembled for different destinations.
FIG. 1a is a profile of a classification yard as shown in FIG. 1 to illustrate the track slopes and the position of measuring and controlling devices forming part of the invention.
Figure 2:
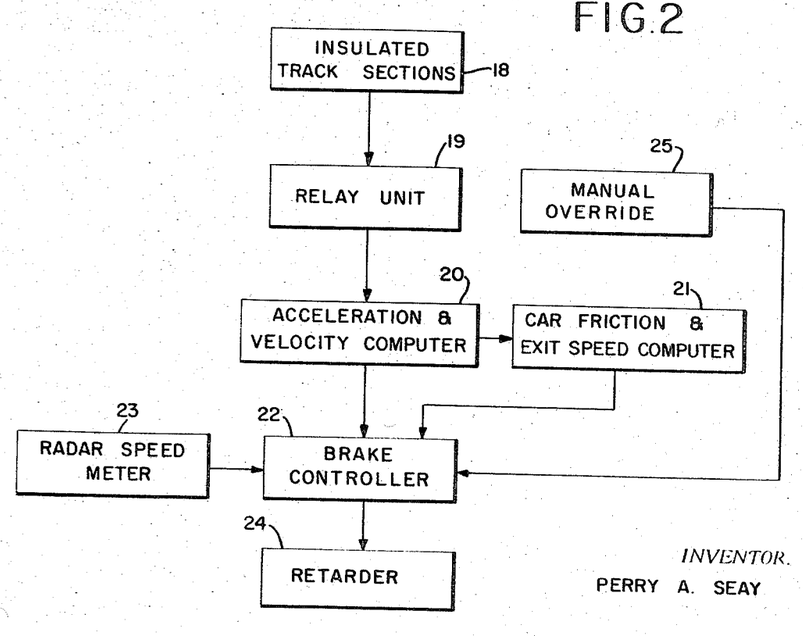
FIG. 2 is a block diagram of car speed measuring and controlling apparatus in accordance with the invention.

Referring now to the drawings and more specifically to FIGS. 1, 1a, and 2, FIG. 1 shows a plan view of a classification yard having a feeder track 10 and a plurality of branching tracks or spurs 11. It is on these spurs that trains are assembled for delivery to different destinations. FIG. 1a is a profile of a classification yard as shown in FIG. 1 but on a somewhat smaller scale. It will be observed that in the illustrated classification yard the track section 10 is of generally uniform slope, while the track sections 11' have a greater slope. However, this relationship is not essential and it will become clear that any relative slopes may be utilized including the case where the slope of track section 10 is the same as the slope of track sections 11 and 11'. Moreover, the slope of the track section 10 can be modified as desired, provided it is steep enough to impart sufficient velocity to each car being classified to carry it on to the desired spur and effect coupling with the car ahead at a specified speed. Since the distance between the end of the retarding section and the target varies with each spur 11 and the number of cars previously directed to each spur, the equipment, as will be shown, is arranged to automatically compensate for these factors.

To measure the velocity and acceleration of each car or car group as it moves down the sloping track 10, the track is preferably formed of insulated sections 12 to 16 inclusive so that electric circuits can be successively closed and opened as a car passes over them. In FIG. 1a, therefore, specific time intervals $t_2-t_1$, $t_3-t_2$ and $t_3-t_1$ are automatically measured. Since the length and slope of sections 12 and 13 are known, both acceleration and velocity together with the combined effects of gravity, wind and friction can be computed by means of times $t_1$ to $t_3$. This information combined with known information of distance and slope to the target may then be used to control the retarding means operating on the cars as they move over the braking or retarding section 17 of track 10. The apparatus for attaining this end is shown in FIG. 2.

In this figure the insulated track sections providing time versus distance measurements are represented by the block 18. Time differences are determined by the relay unit 19 and these differences are fed to the acceleration and velocity computer 20. The output of computer 20 is fed to both the brake controller 22 and the car friction and exit speed computer 21. This last computer also receives information pertaining to the particular spur to which a car is to be directed and the distance it must travel, which factors together with the acceleration and velocity computations enable the computation of the exit speed.

The computed exit speed is fed to the brake controller 22 and with the acceleration and velocity computations determines the degree of retardation required by the retarder 24 in order to effect the desired coupling speed. To insure the desired rate of deceleration, a radar speed meter is used to measure the velocity of a car as it passes through the retarding section 17. This information is continuously fed to the brake controller 22.

If at any time it is necessary to manually control the retarder 24, a manual override 25 is provided and coupled with the brake controller 22. This override renders the automatic equipment inoperative and permits the retarder 24 to be operated manually.

Figure 3A:
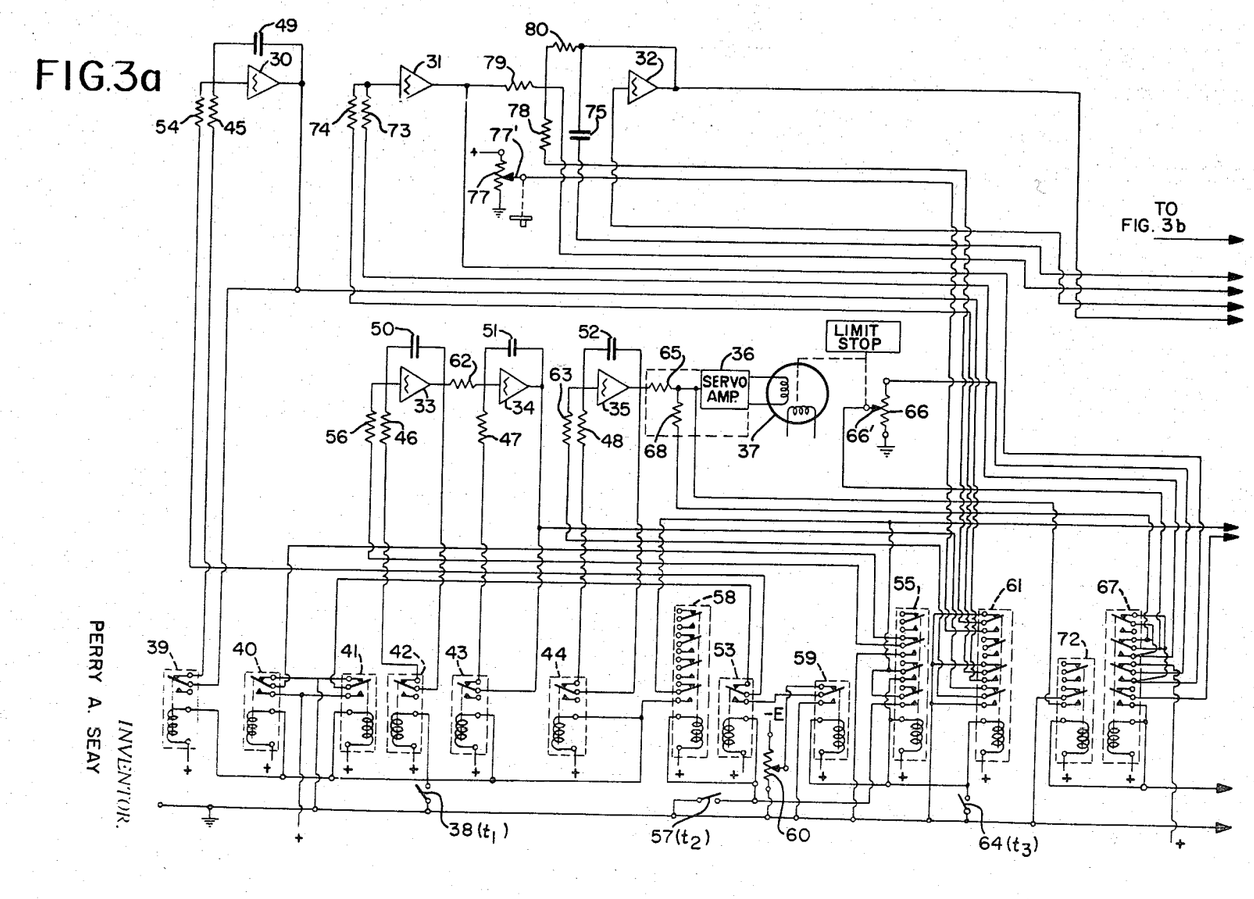
FIGS. 3a to 3c are schematic wiring diagrams of the invention.

One embodiment of the invention for attaining the objectives outlined in FIGS. 1, 1a, and 2 is shown in more detailed form in FIGS. 3a to 8 inclusive. FIGS. 3a to c form a composite wiring diagram with some elements shown in block form for convenience. These elements are in turn shown in detail in FIGS. 4 to 8 inclusive. Before discussing the details of these circuits, however, a brief review of the basic mathematical computations involved will be helpful in more readily understanding the circuitry.

The equations solved by this invention involve distance, time, acceleration and velocity and are as follows:

$$D = V_E t + \tfrac{1}{2} a t^2 \qquad (1)$$

where:
$D$ = distance to target from exit of retarding section 17 (Fig. 1).
$V_E$ = desired velocity at the exit end of the retarding section 17 (Fig. 1).
$a$ = acceleration.
$t$ = time.

and $t$ (time) $= \dfrac{V_T - V_E}{a}$ (2)

where $V_T$ = velocity at the coupling point.

Substituting equation (2) in equation (1)

$$D = \frac{V_T^2 - V_E^2}{2a} \qquad (3)$$

Acceleration, $a$, is actually made up of two separate components, namely, that due to friction and windage acting on the car and that due to the slope of the track on which the car is rolling. This may be expressed by the following equation:

$$a = M_2 g - F_R g \qquad (4)$$

where
$M_2$ = Slope of the track subsequent to the retarder section.
$F_R$ = Friction and Windage coefficient.
$g$ = Gravity.

By substituting equation (4) in equation (3) it is found that $$V_E^2 = V_T^2 - 2gD(M_2 - F_R) \qquad (5)$$

or $$V_E^2 = V_T^2 - 2g(H - DF_R) \qquad (6)$$

where H = height between the coupling point or target, and the retarder exit.

It will be observed that the computer to be described is arranged for the computation of equation (6) and that all the quantities are known except for the friction and windage coefficient. These factors are determined by measuring the acceleration of the car over a section of track prior to entrance of the car into the retarding section 17 (FIG. 1). This section of track actually constitutes the insulated sections 12 and 13 for the measurement of times $t_1$, $t_2$ and $t_3$. Acceleration of the moving car over this section of track is equal to $$a = \frac{78[(t_2 - t_1) - (t_3 - t_2)]}{[(t_2 - t_1)(t_3 - t_2)][(t_3 - t_1)]} \qquad (7)$$

where 78 = the combined length of two equal track sections 12 and 13 in feet.
Equation 7 can be reduced to $$a = \frac{312[(t_2 - t_1) - (t_3 - t_2)]}{(t_3 - t_1)^3} \qquad (8)$$

With the acceleration known, $F_R$ can be determined.

$$F_R = M_1 - \frac{a}{g} \qquad (9)$$

where $M_1$ = track slope prior to retarding section.

Figure 3B:
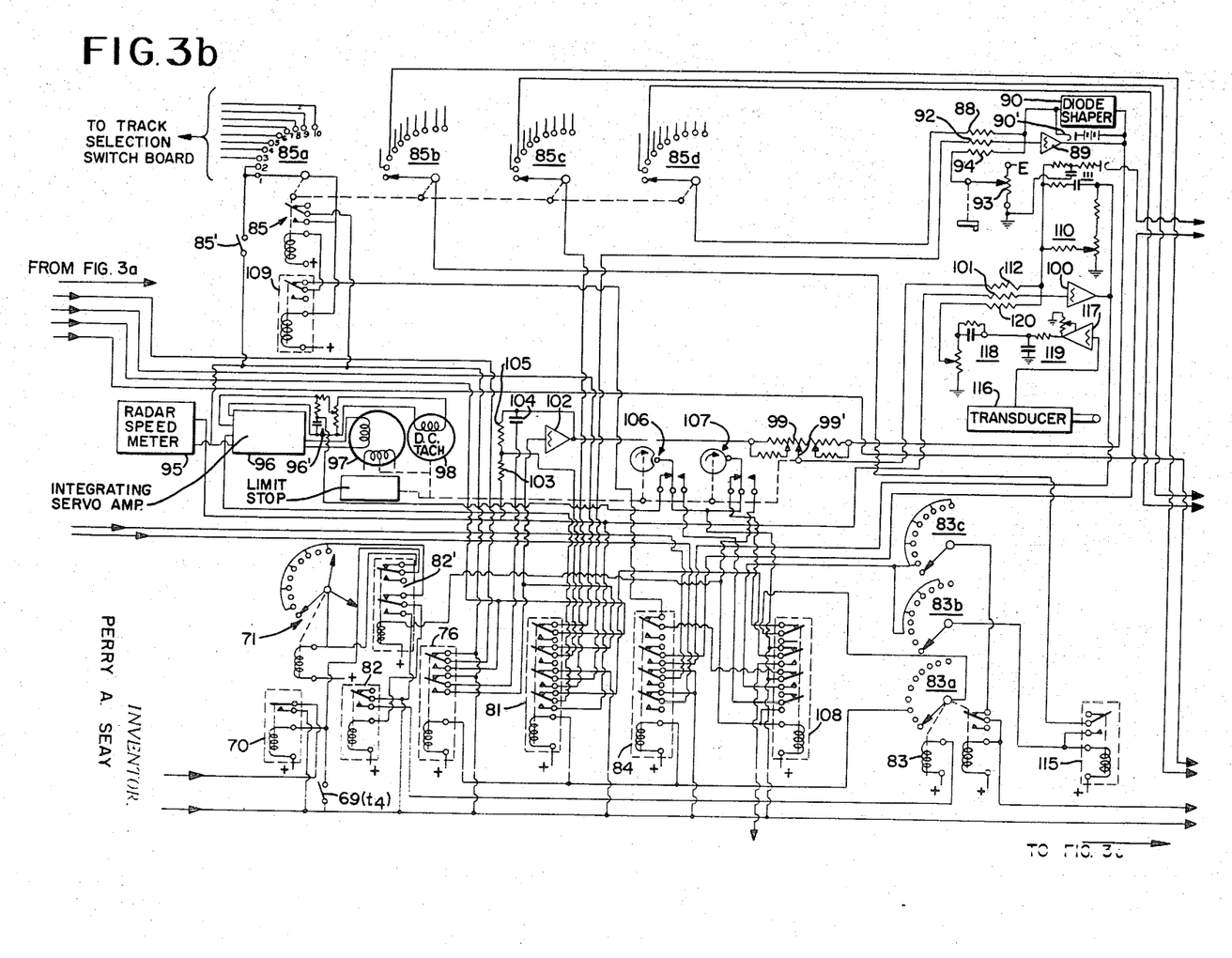
Figures 3C, 9:
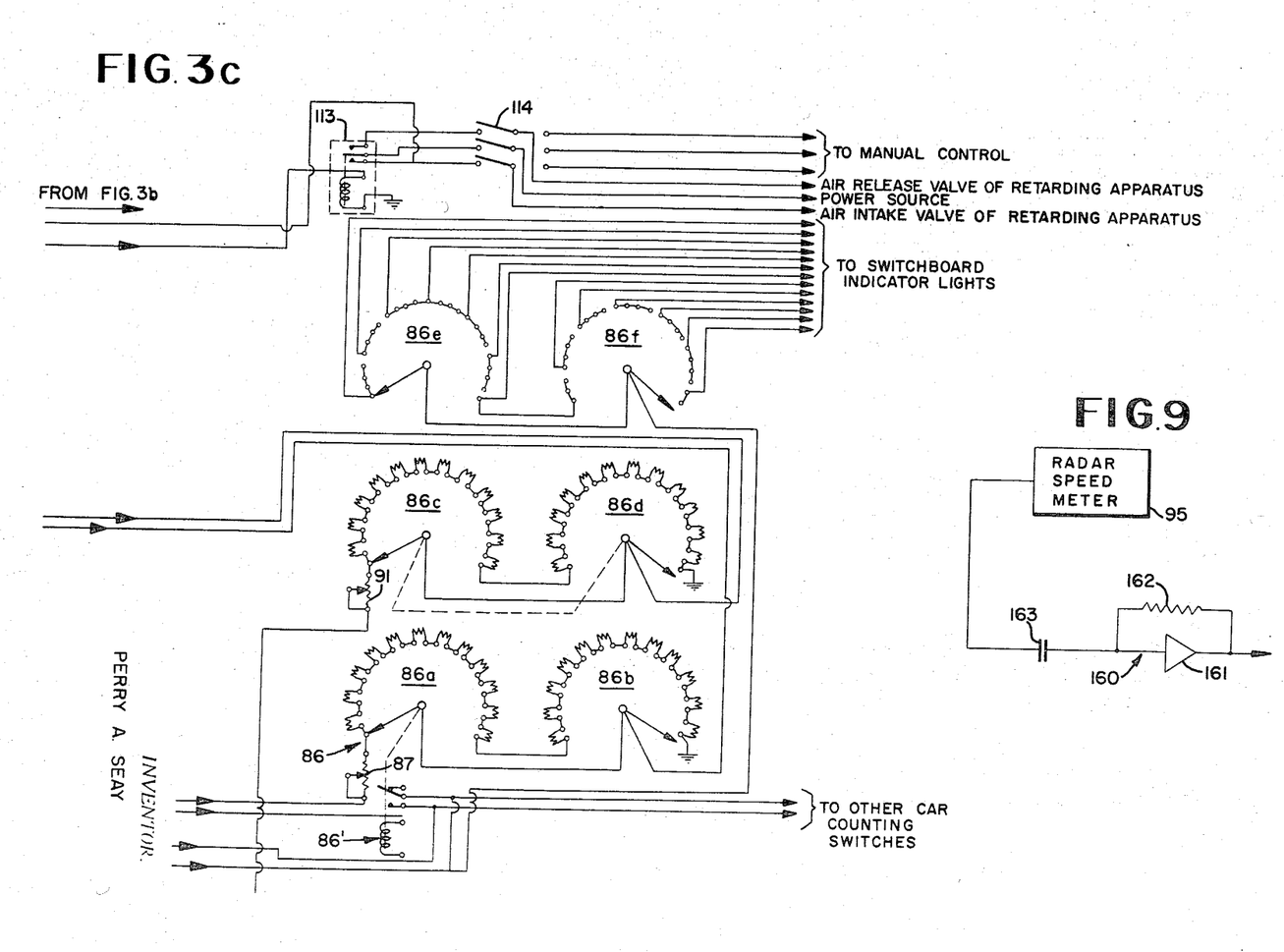
FIG. 9 is a diagram of another embodiment of the invention.

Referring now to the composite diagram shown in FIGS. 3a to c, computing amplifiers 30 to 35 inclusive together with the servoamplifier and motor 36 and 37 comprise the acceleration and velocity portion of the computer. As a car to be classified rolls down the slope 10 and first engages the track section 12 it operates a switch 38 to energize the coils of relays 39 to 44 and thereby record time $t_1$. In so doing, relays 39, 42, 43 and 44 are opened to disconnect resistors 45 to 48 inclusive from between the input and output of integrating amplifiers 30, 33, 34 and 35, respectively, which insure discharge of the associated feedback condensers 49 to 52. Simulatneously a circuit is closed from a positive source of voltage + E through relays 41 and 53, and resistor 54 to the input of amplifier 30. Actuation of relay 40 also closes a circuit from + E through relay 55 and resistor 56 to the input of amplifier 33. In this way amplifiers 30 and 33 receive a positive voltage as the car moves over the initial 39 foot track section 12 and a voltage proportional to time is generated.

As the car moves on to track section 13, a switch 57 representing $t_2$ is operated to energize relays 53 and 58. In the meantime, however, the relays actuated by switch 38 ($t_1$) remain closed. Actuation of relay 53 disconnects the resistor 54 from + E and connects it to a negative source of voltage by means of the potentiometer 60. This condition exists for the duration of a car on track section 13 and the net result at the output of amplifier 30 is a voltage corresponding to a measure of the difference between these two times. A positive voltage is however continued on amplifier 33 for the entire period covered by track sections 12 and 13 therefore a voltage appears at the output of amplifier 33 that is a measure of the total time of travel over both track sections. To compute acceleration of the car according to equation (8), the difference in time of travel of a car over track sections 12 and 13 is required as well as the cube of the total elapsed time. The former is obtained directly from amplifier 30 while the latter is obtained by integrating the output of amplifier 33 two successive times. Thus the output of amplifier 33 is fed through resistor 62 to the input of amplifier 34 which in turn is connected through a closed circuit of relay 61 and resistor 63 to the input of amplifier 35. In this way the cube of the total elapsed time is obtained.

The foregoing computations are completed as soon as the car moves onto track section 14 to actuate switch 64 ($t_3$). Closure of this switch energizes relays 55, 59 and 61 causing relay 59 to ground the input resistor 54 of amplifiers 30. In addition, relay 55 grounds the input of amplifier 33 and relay 61 grounds the input of amplifier 35. During the passage of a car over the track sections 12 and 13 the output of amplifier 35 was being fed through resistor 65 to the servoamplifier 36 and servomotor 37. Servomotor 37 is mechanically coupled to the arm of potentiometer 66 which is connected on one side to ground and on the other side through a closed circuit in relay 67 to a source of positive voltage. The arm 66' of potentiometer 66 is coupled through resistor 68 to the input of servo amplifier 36. The motor drive's potentiometer arm 66' until the voltage input to resistor 68 is proportional to the input to resistor 65. Thus a voltage appears at the arm 66' of potentiometer 66 proportional to the cube of the time $t_3$-$t_1$.

The quantities required for the solution of acceleration in equation (8) have now been obtained and the solution is performed after the car engages track section 16 to operate switch 69 ($t_4$) which then actuates relay 70 and stepping switch 71. Closure of the contacts of relay 70 in turn operates relays 67 and 72. At this instant in time the top side of poten- tiometer 66 is disconnected from the source of positive voltage and applied by means of relay 67 to the output of amplifier 31. Also, potentiometer contact 66' is coupled through a closed circuit in relay 67 and resistor 73 to the input of amplifier 31. This causes the output of amplifier 31 to be inversely proportional to the setting of potentiometer 66, or time cubed, when an input is applied to the input of resistor 74. Now since the operation of switch 64 ($t_3$) closed a circuit in relay 61 coupling the output of amplifier 30 through resistor 74 to amplifier 31, a voltage proportional to the acceleration of the car on track sections 12 and 13 is obtained, in accordance with equation (8). While an electronic system has been employed to attain a voltage related to acceleration, other electromechanical and mechanical apparatus may be used.

The solution of equation (9) is accomplished by the summing amplifier 32 and the resultant signal is stored on condenser 75 connected from the output of amplifier 32 to ground through a closed circuit in relay 76. The attainment of this computation is brought about by feeding the output of amplifier 31 through resistor 79, and a closed circuit in relay 81 to the input of amplifier 32. Also the arm 77' of potentiometer 77, adjusted to produce a voltage equivalent to , is connected through a closed circuit in relay 61 and resistor 78 to the input of amplifier 32. The resistor 80 which effectively bridges the input and output of amplifier 32 is the feedback resistor for that amplifier. The factor of 2 in the solution of this equation is accounted for by the ratio of the feedback resistor 80 and the summing resistor 78.

It was previously pointed out that the distance to the target and consequently the height changes as successive cars are classified and these factors vary with different spur tracks 11. It is therefore necessary to maintain a count of the cars directed to each individual spur and this is attained in part by means of the stepping relay 71 which is responsive to successive closures of switch 69 ($t_4$) brought about by the successive wheels of the car passing over track section 16 having a length of about 2½ feet. Track sections 14 and 15 are also preferably equal in length to section 16. It will be observed that alternate contacts on the stepping relay 71 are connected together and to the coil of relay 82 through normally closed contacts on relay 82'. Every second step causes relay 82 to apply a ground to the coil of the multibank stepping relay 83. The second successive actuation of relay 83 causes a circuit to be closed in bank 83a and this constitutes time $t_5$. Closure of this circuit actuates relays 76, 81 and 84. Energization of relay 84 removes a locking ground from relays 39 to 44, 58, 53, 55, 61, 72 and 67 to reset amplifiers 30 and 33 to 35.

Prior to the time $t_5$ and preferably prior to the time $t_1$, track selection for the car being classified will have been accomplished by applying a ground to one of the contacts of the contact bank 85a of stopping switch 85. Placement of this ground on a given contact representing one spur 11 will cause the switch arm to stop at that contact and thus feed that information to the computing equipment by means of the coordinated switch banks 85b to 85d as will be described.

Operation of switch 85 between times $t_5$ and $t_6$+, when braking occurs, is prevented by removing the ground from the normally closed contacts of relay 109. This is accomplished by a connection from the uppermost contact on relay 109 through contacts on relays 84 and 108 to ground. Switch 85' when closed will cause switch 85 to step around to the initial or starting position and remain there in the absence of any other ground on contacts 85a. This switch will normally be disposed on a central control board though it may be automatically operated by suitable interconnection with the equipment.

Assuming now that a ground is applied from the track selection board to contact 3 of switch bank 85a. Upon actuation of this switch the contactors of banks 85b to 85d will move an equal number of steps. The switch bank 85b is connected to the coil of stopping switch 86 having six banks 86a to 86f. Car count information is channeled through the bank 85b to the coil of the appropriate stepping switch 86 to step the contactor of each bank forward one step for each car passing through the retarder. The banks 86a and b form in effect one bank and have resistors connected between successive contacts. These banks represent the changing distance to the target as cars are directed to a given spur inasmuch as one such switch 86 is provided for each spur. The banks 86c and d record changes in height between the retarder and target while 86e and 86f merely function to operate control switchboard indicator lights to inform the operator of the number of cars on each spur, in four car multiples.

Having described the means for obtaining information as to changes in height and distance for each spur 11, the remainder of the computations to control the speed of a given car will now be discussed.

At time $t_5$, relay 76 was operated by the action of stepping switch 83 and, among other things, caused the ground side of condenser 75 to be connected with the input of amplifier 32. This caused the voltage on that condenser to be memorized or stored until needed. The output of amplifier 32 is fed directly to a rheostat 87 and through the switch banks 86a and b to contact 3 of the switch bank 85d of stepping switch 85. At this point the output of amplifier 32, or the voltage equivalent to $F_R$, has been multiplied by $2g$ times the distance to the target so that the signal on the associated contact arm is now $2gF_RD$. This voltage is then fed through resistor 88 to the input of the summing amplifier 89 having a diode shaper connected in parallel therewith.

Referring again to stepping switch 86, the banks 86c and d are connected in series and, along with the rheostat 91, are connected across a constant source of voltage. The voltage on contact 3 of switch bank 85c is a voltage proportional to $2gH$. This voltage is fed through closed contacts on energized relay 81 and resistor 92 to the input of amplifier 89. A third voltage, namely, $V_T^2$ representing the desired coupling velocity, is obtained from potentiometer 93 and is fed through resistor 94 to amplifier 89. The output voltage of amplifier 89 is now proportional to $V_E$ which is the desired car speed at the exit of the retarding section of track 17. While the actual output of amplifier 89 is proportional to $V_E^2$ the diode shaper 90 acts as a variable feedback loop and extracts the square root of $V_E^2$ in order to obtain $V_E$.

Figure 8:
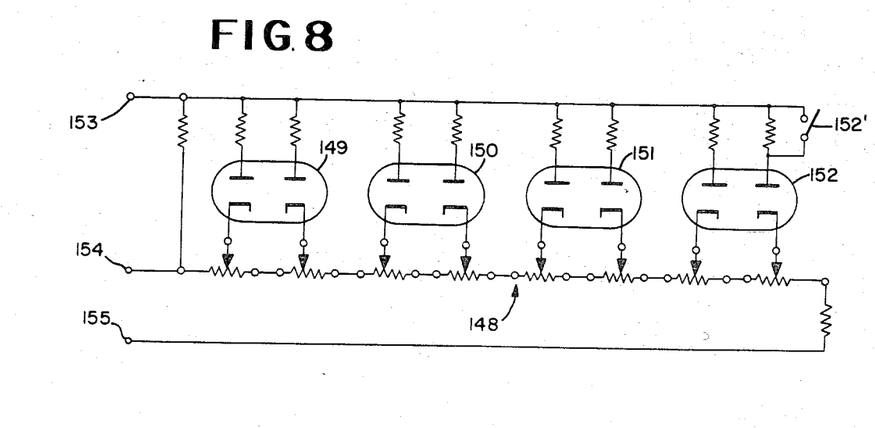
FIG. 8 is a wiring diagram of a summing network and diode shaper.

In certain cases it has been found desirable to limit the minimum and maximum exit speeds of the car which may be accomplished by controlling the minimum and maximum values of $V_E$. To provide for a minimum value of $V_E$, a network 90' having a diode and a battery is bridged across the diode shaper 90 as illustrated in FIG. 3b. The maximum value of $V_E$ can be controlled by short circuiting the series resistor on one of the diodes 149 to 152 of the diode shaper 90 as shown in FIG. 8 of the drawings. For illustrative purposes a switch 152' is shown across the resistor for the last diode. However, any desired maximum value may be attained by shorting the series resistor of the appropriate diode.

Knowing the desired exit velocity for each car as it leaves the retarding section, means are preferably employed to measure the speed of a car as it passes through the retarder to insure that the desired rate and degree of retardation will be attained. This is accomplished by the radar speed meter 95 and associated equipment now to be described.

Prior to time $t_5$, the radar speed meter 95 detects the speed of the oncoming car and produces a voltage proportional to the velocity of the car. This voltage is fed to the integrating servo amplifier 96 at time $t5$ by means of a closed circuit in relay 81 for driving the servomotor 97 and DC tachometer 98. To insure discharge of the condenser in the integrating network 96' connected with amplifier 96, a connection from cam switch 106 functions to short this condenser at all times except during the interval $t5$ to $t6$. The motor 97 is thus driven at a speed proportional to the car velocity which in turn drives the potentiometer arm 99' of potentiometer 99. (Note that voltage $V_E$ from amplifier 89 is fed to one end terminal of this potentiometer.) This action continues from the time $t_5$ until the time $t_6$ when the car leaves the retarding section 17. In addition to the coupling between the radar speed meter and the amplifier 96, a portion of the signal from the speed meter is fed continuously to amplifier 100 through a series input resistor 101. Prior to the time $t_5$ when relay 81 is operated, the signal from the radar meter is also fed to the input of amplifier 102 by means of a closed circuit in relay 81 and the series input resistor 103. This latter action stored a signal corresponding to velocity of the car at time $t_5$ on condenser 104 connected from the output of the amplifier 102 through relay 76 to ground. At time $t$ 5 the input to amplifier 102 is disconnected by actuation of relay 81 and relay 76 then functions to connect condenser 104 across the amplifier 102. At this time the feedback resistor 105 of amplifier 102 is also disconnected. The output of amplifier 102 is now $V_S$ or the velocity of the car as it enters the retarder track 17. This output is fed directly to the left end of the potentiometer 99 as shown.

The servomotor 97 in addition to driving the DC tachometer 98 that provides a feedback voltage for the amplifier 96, also drives two cam switches 106 and 107. Cam switch 106 prior to time $t5$ applies a ground to the integrating network 96' in the tachometer output and thereby prevents overshoot when the servo hits the lower limit stop. After time $t_5$ cam switch 106 sets up a self-locking circuit for relay 108. Cam switch 107 during the major portion of its rotation completes a circuit from ground through switch bank 83a to permit relays 76, 81 and 84 to be operated at $t_5$. At time $t_6$ switch 107 functions to actuate relay 108 to deenergize relays 76, 81 and 84 and apply a reversing voltage to the servoamplifier 96 to return the arm 99' of potentiometer 99 to the start position for controlling the next car. Relay 108 is then automatically deenergized.

During the period $t_5$ to $t6$ a signal is fed from the arm 99' of potentiometer 99 through resistor 112 to the amplifier 100, having adjustable feedback networks for amplifier stablization. These networks are denoted generally by the numerals 110 and 111. The difference between the voltage $V_C$ and the metered voltage $V_M$ fed to amplifier 100 through resistors 112 and 101, respectively, produces an error voltage at the output of amplifier 100 during the time $t_5$-$t_6$. This voltage is applied through the energized relay 84 to a differential relay 113 which in turn is connected to a triple-pole double-throw switch 114. This switch permits either manual or automatic operation of pneumatic retarding apparatus of the type customarily used for this purpose.

In order to prevent the retarder from exerting maximum effort on the car, a feedback signal is developed through the use of a pressure transducer 116 and amplifier 117. The developed signal is proportional to the pressure delivered to the brake and is fed to amplifier 100 through RC networks generally denoted by the numerals 118 and 119 and a series resistor 120. This signal is of opposite polarity to the error signal developed by amplifier 100 and tends to limit the effect of the large error signal on the braking means and causes the brake to be applied more gradually. As the car slows down on the retarding track section 17, the radar speed meter 95 reflects this change and the difference between the car velocity $V_C$ and the metered velocity $V_M$ will gradually approach zero, at which time the car is released for movement to the target. This time is of course $t_6$. An additional electrical feedback circuit from switch 114 through a rectifier and RC network generally denoted by the numeral 111 to the input of amplifier 100 further controls the braking operation. In this way the car speed is prevented from falling below the exit speed.

When a car is released from the retarder the cam switch 107 actuates relay 108 and applies a ground to the switch bank 83b. This trips the relay 115 which in turn causes the step switch 86 associated with the particular spur 11 to which the car had been directed to be stepped forward one step for the purpose previously described. The relay bank 83c together with relay 86' function to return the step switch 83 to start position after the car is released.

It is apparent from the above that the apparatus is readily adaptable for use with a car classification system having any number of tracks and may be quickly and easily adjusted to compensate for different effective track slopes. In order to avoid undue complication of the description a number of the circuits for locking relays in one position or another have not been discussed. The circuits however have been clearly illustrated and will be readily understood by those skilled in the art.

Having described the operation of a retarder in accordance with the invention reference is now made to FIGS. 5 through 8 inclusive showing details of certain of the more complicated components.

Figure 4:
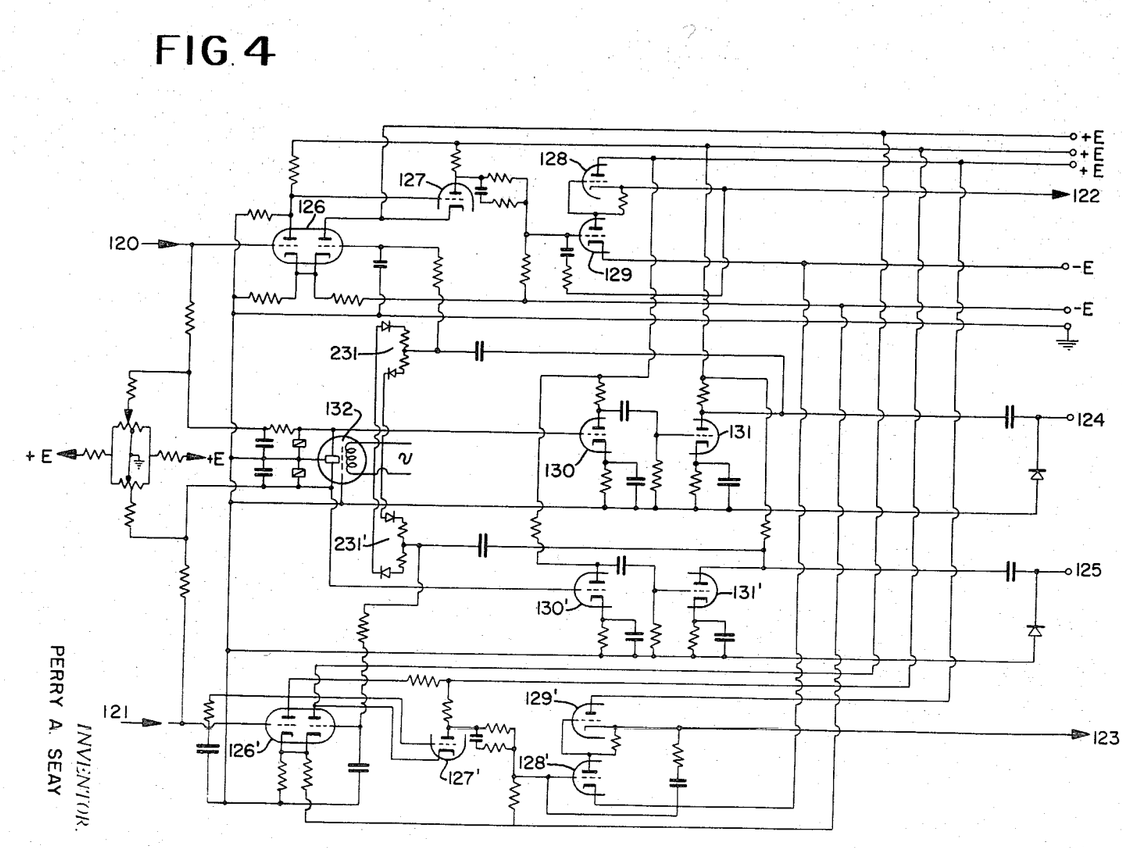
FIG. 4 is a schematic wiring diagram of the computing amplifiers shown in block form in FIGS. 3a to 3c.

FIG. 4 is a circuit diagram of a pair of identical high-gain phase-inverting direct current computing amplifiers constructed as a single unit. Amplifiers of this type are used to meet the requirements of amplifiers 30, 31, 32, 33, 34, 35, 89, 100 and 102, and while they may take any one of a variety of forms, the illustrated embodiment has been found particularly desirable. It includes input terminals 120 and 121, output terminals 122 and 123 and a pair of overload terminals 124 and 125 to indicate and overload condition in each amplifier for the purpose of signalling an incorrect computation.

Briefly, one amplifier section includes the tubes 126 to 131 while the other includes the tubes 126' to 131'. Considering the upper amplifier, the input tube 126 is a differential amplifier and the grid of the first section connects with the external input and feedback resistors. The grid of the second section of tube 126 is used to introduce balancing signals. Since any signal applied to the grid of the second section of tube 126 is coupled to the first section through a common cathode, the signal at the plate of the first section is proportional to the difference between the two grids and is out of phase with the difference. In normal operation the cathodes of tube 126 while negatively biased are near ground potential and the current is negligible. If the cathode moves away from ground the resistance is automatically reduced in the cathode circuit by means of an auxiliary return circuit and prevents the balancing section from being cut off in the event of a large input signal. The output of the first section of tube 126 is coupled directly to the grid of tube 127 and its output is coupled to tube 129. Tubes 128 and 129 are connected in cascade with the former functioning as the plate load for the latter. In this way the load on tube 129 is inversely proportional to its plate current and provides relatively large gain for tube 129.

Drift is an inherent characteristic of DC amplifiers and is controlled in the instant application by the tubes 130 and 131 and the chopper 132. A part of the input signal at terminal 120 is converted by chopper 132 to produce a square wave pulse which is then amplified by the tubes 130 and 131. The output of the tube 131 is connected to a phase sensitive demodulator generally denoted by the numeral 231. The voltage of the vibrator coil is applied to the demodulator through the reversely connected crystals and current will flow for one-half of each vibrator cycle. The phase relationship between the vibrating element of the vibrator 132 and the demodulator 231 is such that current will flow through the demodulator when the associated vibrator contact is not grounded. As long as there is no output from the tube 131 the junction of the demodulator resistors remains at ground potential. However, the presence of an AC signal at this point causes it to move away from ground during the half cycle when the demodulator crystals are passing current. On the other half cycle current flows through only one resistor by reason of the rectifying action of the crystals. Thus a larger voltage appears at the junction of the demodulator resistors during the latter half cycle. The average DC potential at this junction is out of phase with the DC drift signal at the input of the amplifier and is filtered and applied to the grid of the second section of tube 126. This stabilizes the amplifier.

Static unbalance is compensated for by modifying the input signal to tube 130 so that a zero output signal from the amplifier output terminal 122 is obtained when no signal is applied to the input terminal 120.

When the input signal applied to terminal 120 will overload the amplifier, a large output signal will be obtained from tube 131. A portion of this output appears at terminal 124 and is used to provide suitable oral and visual indications for notifying the operator that the computation is not correct and the amplifier has been overloaded.

It is a characteristic of high-gain DC amplifiers of the type described above that the relationship of the input and output voltages is a function of the feedback and input impedances. When these impedances are resistive, their ratio can be adjusted to any value so that any desired scale factor be obtained. When several input signals are applied to the input of one amplifier simultaneously through separate input or summing resistors, the output is the algebraic sum of the several inputs each multiplied by the ratio of the feedback resistance to the appropriate input resistance.

Integration can be accomplished by making the feedback impedance a capacitor and the input impedance a resistor. With this arrangement the output voltage is the time integral of the input voltage as in the case of amplifiers 30 and 33 to 35 of FIG. 3a.

Figure 5:
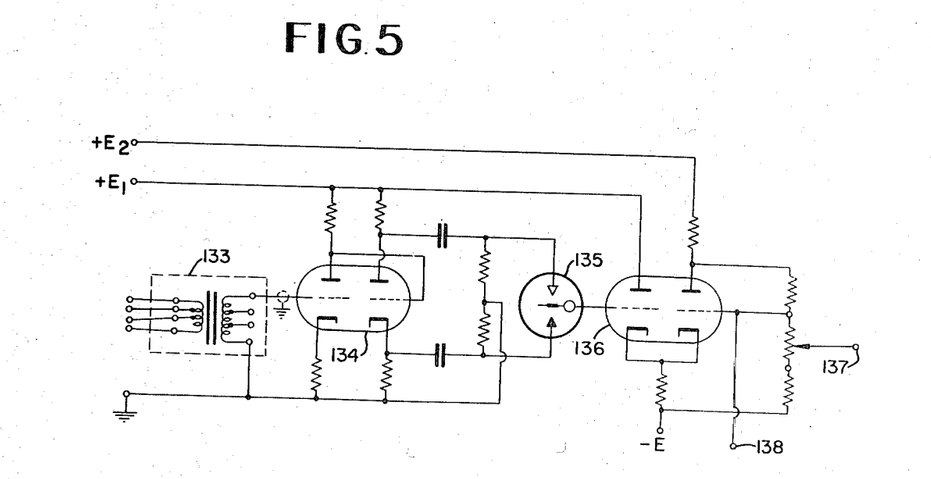
FIG. 5 is a schematic wiring diagram of the transducer amplifier of FIGS. 3a to 3c.

The transducer amplifier 117 is shown in FIG. 5 and comprises an input transformer 133 connected with a dual triode 134 having direct coupling between the sections thereof with the second section being connected as a phase inverter. The output of the phase inverting is fed to a single-pole double-throw vibrator 135 which is in turn connected with the grid of the first section of the dual triode 136. The two sections of this tube are cathode-coupled and the second section produces a DC output signal at terminal 137. A suitable control voltage is applied to the grid of the second section of tube 136 by means of the terminal 138. In this way an alternating current from the transducer 116 is amplified and rectified for introduction to amplifier 100 as described.

Figure 6:
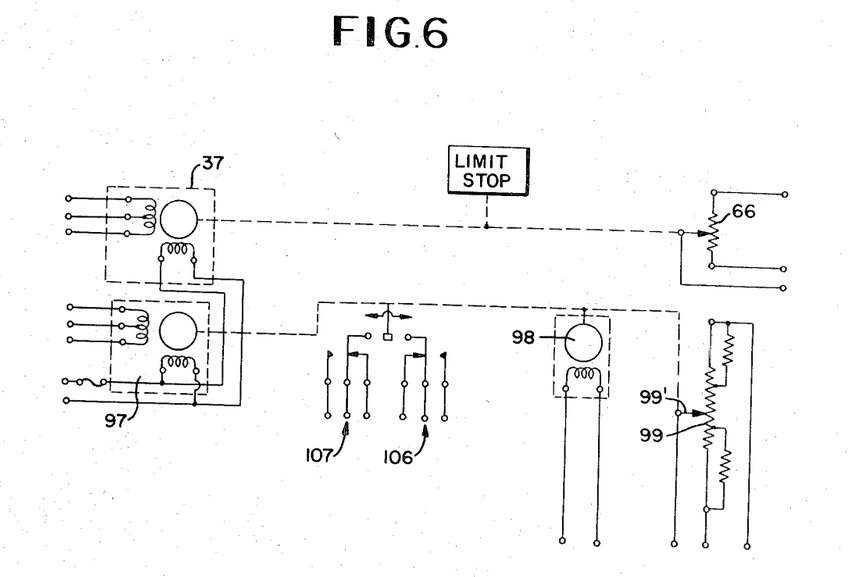
FIG. 6 is a detailed circuit of the servomotors and related components used in the computation of acceleration and velocity and control of the retarding means.

FIG. 6 has been included to show in somewhat greater detail, the servomotors 37 and 97 and associated equipment that have been described in connection with FIGS. 3a to cinclusive. For convenience of assembly, this equipment forms a single unit of the apparatus.

Figure 7:
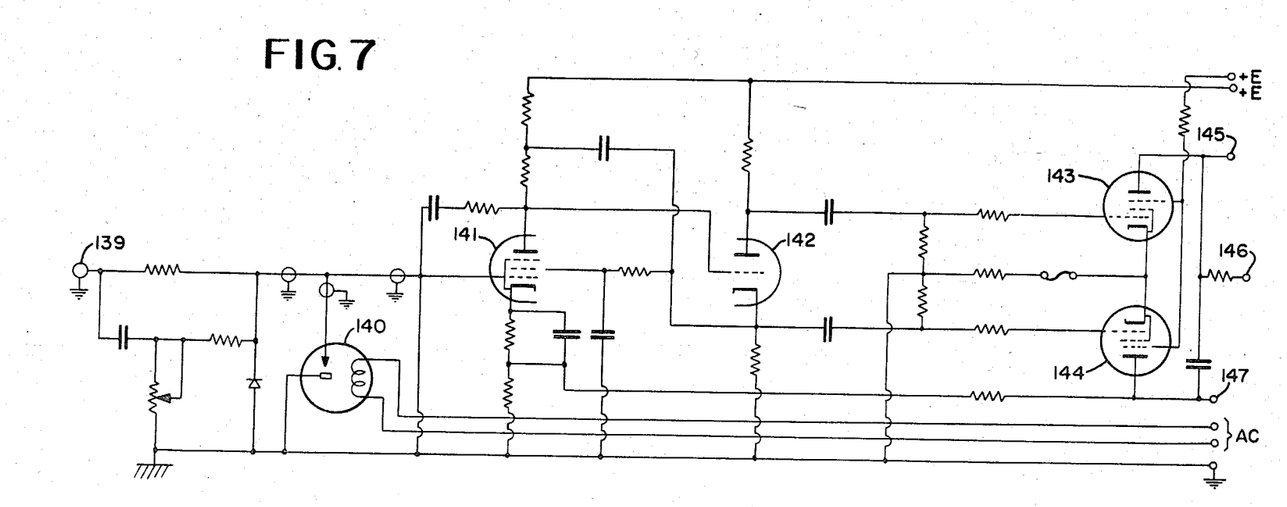
FIG. 7 is a wiring diagram of one servoamplifier.

In FIG. 7, there is illustrated one embodiment of a servoamplifier such as the amplifiers 36 and 96. It includes an input terminal 139, a chopper 140 for interrupting the input signal and amplifier tubes 141 to 144 inclusive. The output tubes 143 and 144 are connected to produce a push-pull output signal at the output terminals 145 and 147, which connect directly to the motor control field winding. Degenerative feedback is obtained by feeding a small portion of the signal from terminal 147 to the cathode of tube 141. The other terminals shown are for application of suitable power to operate the amplifier as indicated.

The diode shaper 90 is illustrated in FIG. 8 and comprises a voltage divider having a plurality of diodes 149 to 152 with their cathodes connected to spaced points along the divider 148. The plate of each diode is connected through a series resistor to the output terminal 153 which is connected to the input of amplifier 89. In operation, a DC voltage is placed on terminal 155 and terminal 154 is connected to the output of amplifier 89. Changes in the output voltage of amplifier 89 cause one or more diodes 149 to 152 to become conducting and vary the impedance of the device as measured between the terminals 153 and 154. Thus when used in the feedback circuit of a DC computing amplifier, the impedance of the circuit is varied with voltage at the output of the amplifier. By adjustment of the voltage divider and series plate resistors, the current in the feedback circuit can be made to vary in accordance with the square of the output voltage of the amplifier and thus obtain the desired response from its associated amplifier such as amplifier 89. The utilization of the switch 152' to short the series resistor of one of the diodes 149 to 152 will function to limit the maximum value of $V_E$ as previously described.

FIG. 9 of the drawings illustrates an alternate procedure for determining car acceleration prior to its entrance to the retarder. In this embodiment of the invention, the radar speed meter 95, in addition to its functions as described above is arranged to deliver a signal to a differentiating amplifier generally denoted by the numeral 160 and comprising a DC amplifier 161, a feedback resistor 162 and input coupling condenser 163. Differentiating the radar signal in this way produces a signal at the output that is a direct measure of acceleration. This signal could then be substituted in FIG. 3a for the signal produced by the output of amplifier 31, and thereby eliminate amplifiers 30, 31 and 33 to 35 as well as equipment associated therewith.

From the foregoing description of the invention it can be seen that it is applicable to cases involving both level and sloping tracks. In the case of a level track, the car is preferably driven by an engine at a velocity equal to or exceeding that required to move it to its destination, whereupon it is released and then controlled as though the moving force had been a sloping track. In addition, the retarding means may also include suitable driving means to increase the speed of the car in the event its speed is below the desired speed.

While only one embodiment of the invention has been shown and described, it is apparent that numerous modifications, changes and alterations may be made without departing from the true scope and spirit thereof.

I claim:

1. In a retarder control system for controlling the speeds of railway cars rolling over a section of railway track which includes a car retarder from which each car is to be released at a predetermined computed exit speed; said system including computer means adapted to respond to the acceleration of each car prior to its entry into said car retarder and to other parameters including but not limited to the distance each car is to roll after leaving said car retarder to reach its destination, the velocity at which the car is to couple at said destination, and the characteristic of the track over which the car is to roll to reach its destination for computing said predetermined exit speed; the combination for determinating the acceleration of each car approaching said car retarder comprising:
 a. radar velocity measuring means associated with said section of railway track for continuously measuring the actual velocity of each rolling car throughout a portion of said section of track prior to the entry of said car into said car retarder, said radar velocity measuring means producing a first signal varying according to the actual velocity of said car moving over said portion of said section of track prior to said car retarder;
 b. differentiating circuit means coupled to said radar velocity measuring means and responsive to said first signal for determining the rate of change of the actual velocity of said car with respect to time as said car is moving over said portion of said section of track, said rate of change of the actual velocity with respect to time being the acceleration of said car, said differentiating circuit means producing a second signal varying according to the acceleration of said railway car approaching said retarder; and
 c. means coupling said differentiating circuit means to said computer means for conveying said second signal varying according to acceleration to said computer means for use in computing said predetermined exit speed.

2. The combination as defined by claim 1 wherein said differentiating circuit includes an amplifier, a feedback resistor coupled between the input and output of said amplifier, and an input condenser coupled in series with the input of said amplifier.

3. In a railway retarder control system for controlling the speeds of railway cars rolling over a section of track, said system including a car retarder located along said section of track, the combination for controlling the braking of said car retarder upon cars passing therethrough comprising:
 a. radar velocity measuring means associated with said section of track for continuously measuring the actual velocity of each rolling car throughout a portion of said section of track prior to its entry into as well as throughout its passage through said car retarder, said radar velocity measuring means producing a first signal varying according to the actual velocity of said car;
 b. differentiating circuit means coupled to said radar velocity measuring means and responsive to said first signal for determining the rate of change of the actual velocity of said car with respect to time as said car approaches said car retarder and prior to its entry into said car retarder, said differentiating circuit means producing a second signal varying according to the acceleration of said car approaching said car retarder;
 c. storage means coupled to said radar velocity measuring means and responsive to said first signal for producing and storing a third signal equal to the actual velocity which said car has at the entrance to said car retarder;
 d. computer means for computing and producing an output signal representing the desired exit velocity at which said car should leave said car retarder, said computer means being responsive to the distance said car is to roll after leaving said retarder, the velocity said car should have at its destination, the slope of the section of track extending from said retarder to said destination, and to the acceleration of said car approaching said car retarder;
 e. means coupling said differentiating circuit means to said computing means for supplying said second signal varying according to the acceleration of said car to said computing means;
 f. control means coupled to said radar velocity measuring means, said storage means, and said computer means, said control means being responsive to said first signal, said third signal, and said output signal for producing a braking control signal; and
 g. means adapted for coupling said control means to said car retarder for controlling the braking of said car retarder upon said car in accordance with said braking control signal.

4. The combination as defined by claim 3 wherein said control means includes means responsive to said third signal and to said output signal for producing a signal varying according to the instantaneous velocity which said car should have at any point within said retarder while moving from the entrance of said retarder through said retarder to its exit to achieve the desired exit velocity.

5. The combination as defined by claim 4 wherein said control means further includes comparing means, said comparing means being responsive to said signal varying according to the instantaneous velocity which said car should have at any point within said retarder while moving from the entrance of said retarder through said retarder to its exit and to said first signal varying according to the measured actual velocity of said car as said car is passing through said retarder for producing said braking control signal, said braking control signal varying according to the difference between said signal varying according to the instantaneous velocity which said car should have at any point within said retarder and said first signal.